(12) United States Patent
Walter et al.

(10) Patent No.: US 7,635,270 B2
(45) Date of Patent: Dec. 22, 2009

(54) METHOD AND APPARATUS FOR TRANSFERRING DIGITAL PACKET-BASED DATA

(75) Inventors: Edward Walter, Boerne, TX (US); Steven M. Wollmershauser, San Antonio, TX (US); Vernon Reed, Austin, TX (US); Donald True, Cedar Park, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 31 days.

(21) Appl. No.: 11/505,170

(22) Filed: Aug. 15, 2006

(65) Prior Publication Data
US 2007/0281541 A1 Dec. 6, 2007

Related U.S. Application Data

(60) Provisional application No. 60/809,922, filed on May 31, 2006.

(51) Int. Cl.
*H01R 12/00* (2006.01)

(52) U.S. Cl. .................. 439/76.1; 228/245; 361/752
(58) Field of Classification Search .............. 439/76.1; 228/245, 248.1; 361/752
See application file for complete search history.

(56) References Cited

U.S. PATENT DOCUMENTS

| | | | |
|---|---|---|---|
| 6,362,709 B1 | 3/2002 | Paxman et al. | |
| 6,790,049 B2 * | 9/2004 | Kaylie et al. | 439/76.1 |
| 7,007,296 B2 | 2/2006 | Rakib | |
| 2001/0037512 A1 | 11/2001 | Flickner et al. | |
| 2002/0083466 A1 | 6/2002 | Ina | |
| 2002/0093596 A1 | 7/2002 | Grasty | |
| 2002/0174423 A1 | 11/2002 | Fifield et al. | |
| 2002/0191644 A1 | 12/2002 | Swisher et al. | |
| 2004/0168200 A1 | 8/2004 | Richter et al. | |
| 2005/0034159 A1 | 2/2005 | Ophir et al. | |
| 2005/0186821 A1 * | 8/2005 | Franks | 439/271 |

FOREIGN PATENT DOCUMENTS

| | | |
|---|---|---|
| EP | 1505833 | 7/2005 |
| GB | 2328346 | 2/1999 |
| WO | WO-0156289 | 8/2001 |

OTHER PUBLICATIONS

"International Application Serial No. PCT/US2007/013036, International Search Report mailed Nov. 21, 2008", 10 pgs.

* cited by examiner

*Primary Examiner*—Truc T Nguyen
(74) *Attorney, Agent, or Firm*—Hanley, Flight and Zimmerman, LLC

(57) ABSTRACT

An impedance imbalance connector is provided. The connector comprises a first port connectable to a first section of coaxial cable, the first port having a first impedance and the first port further to receive digital packet-based data from a first device. The connector further comprises a second port connectable to a second section of coaxial cable, the second port having a second impedance which differs from the first impedance so as operationally to create an impedance imbalance between the second port and the second section of the coaxial cable.

19 Claims, 6 Drawing Sheets

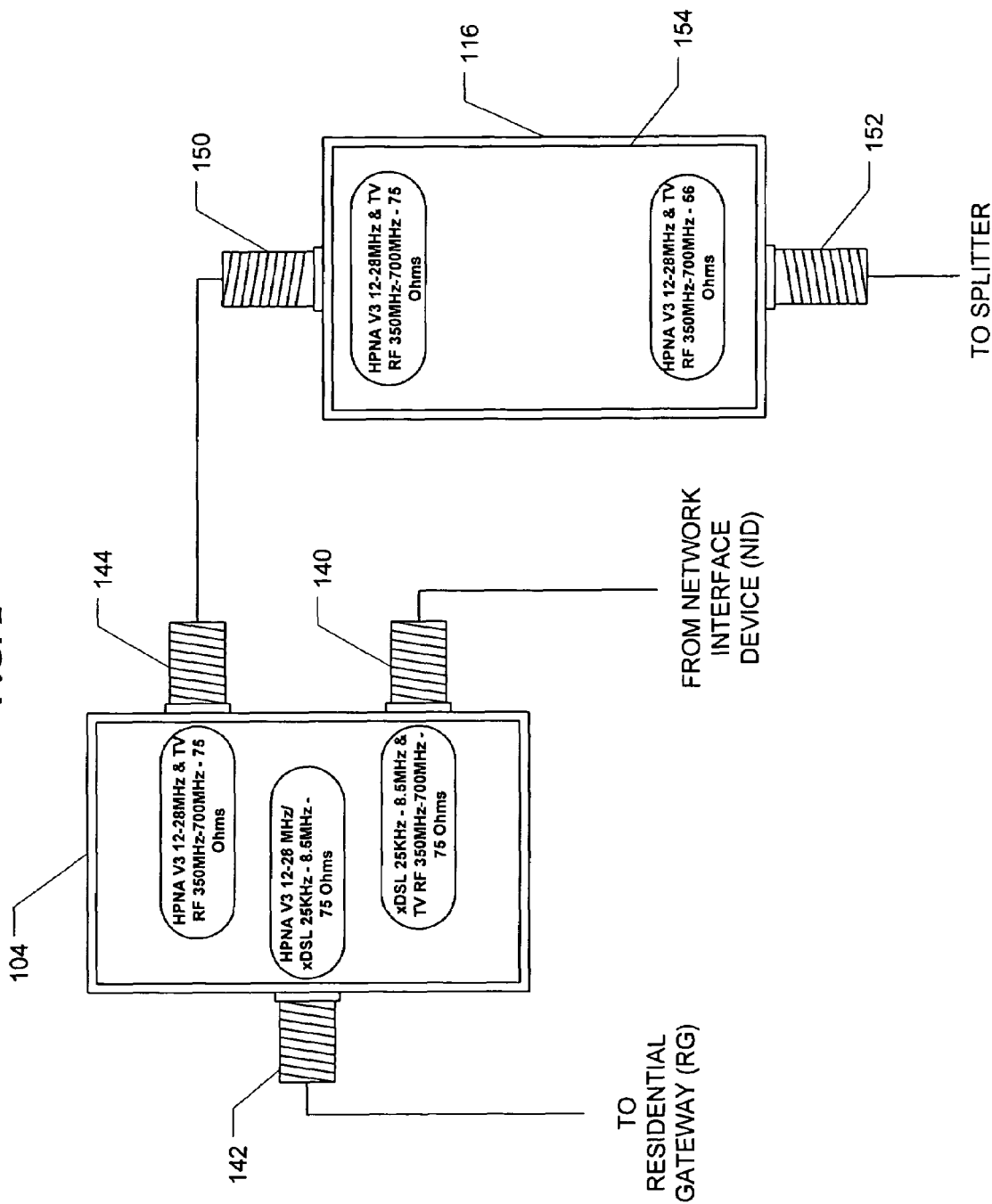

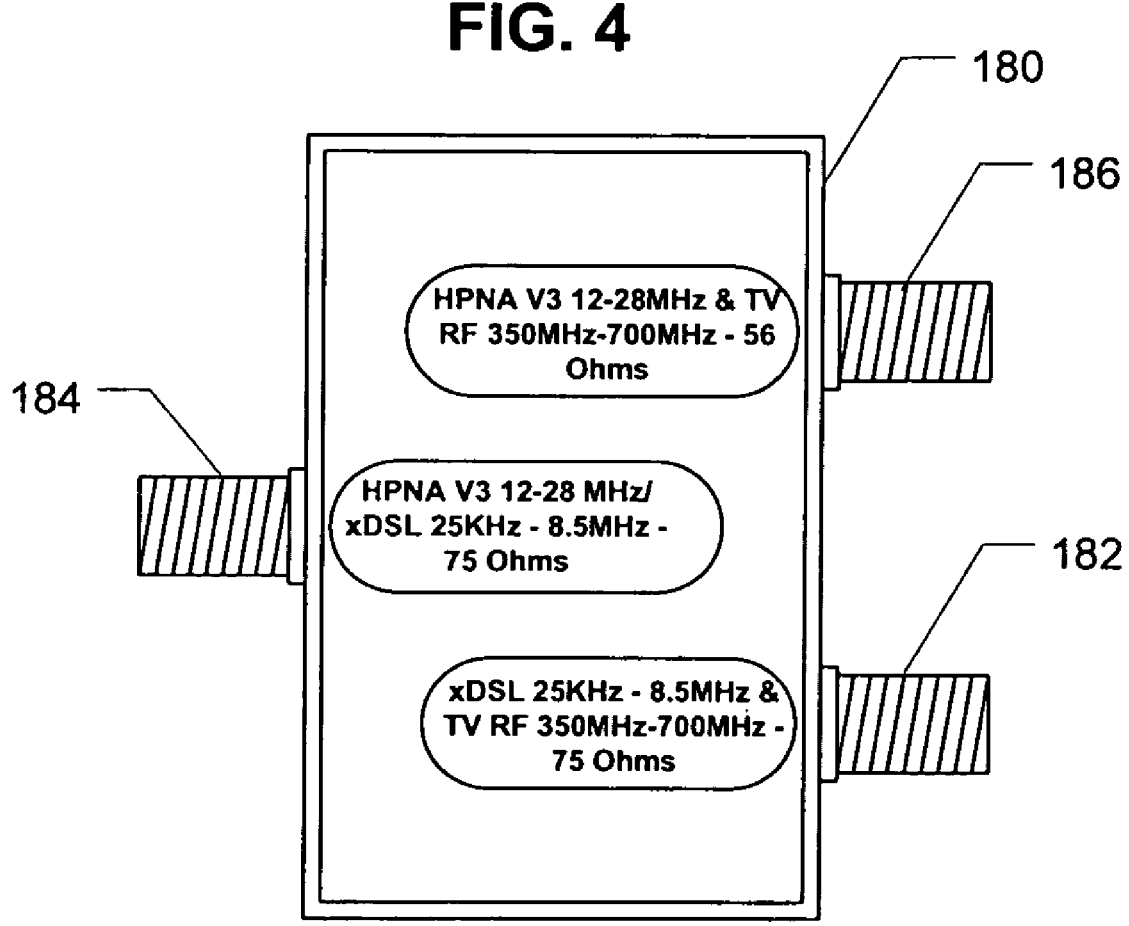

METHOD AND APPARATUS FOR TRANSFERRING DIGITAL PACKET-BASED DATA

CLAIM OF PRIORITY

This patent claims the priority benefit of the filing date of Provisional Application Ser. No. 60/809,922 filed May 31, 2006, the entire content of which is incorporated herein by reference.

FIELD OF THE DISCLOSURE

The present disclosure relates to an apparatus for transferring digital packet-based data over two sections of a coaxial cable. The disclosure further relates to a method of manufacturing an apparatus for transferring digital packet-based data over two sections of a coaxial cable, as well as a method of transferring digital packet-based data over two sections of a coaxial cable. The data may typically be video data.

BACKGROUND

Coaxial cables have been used for years in cabling systems providing different television channels to homes. Today, coaxial cables are also used to provide a growing number of residences with packet-based high-speed Internet access. Cabling systems may today apply packet-based technologies that further enable home owners to make telephone calls and to receive programming technologies over their coaxial cable infrastructure, thereby creating a home network.

Cable equipment, and in particular coaxial cables, have been extensively used in home environments, as they have been designed to shield signals carried on the cable from outside interference. Television sets are also designed to only accept signals from the point of connection to the cable or antenna. However, connectors used in any of these systems may still allow for interference to enter the systems, especially in analogue television systems, which may result in a double television image ("ghosting") or signal attenuation.

Historically, very long cabling systems comprising coaxial cables connected various antennas to the television sets of subscribers. To overcome the weakening of the signals across the coaxial cables, amplifiers were used at regular intervals across the cabling systems to amplify or boost the signal strength. This ensured a strong enough analogue signal for television viewing.

Passive devices such as splitters, diplexers or combiners, are devices used in coaxial cabling systems that allow signals (e.g., direct broadcast satellite TV signals from a dish to the receiver) to piggyback on one regular coaxial cable, along with lower-frequency signals from an outdoor terrestrial TV antenna for local channels. This is useful in homes which are pre-wired, as it eliminates the need for unsightly extra cables. A diplexer typically joins or separates two signals, to be used by different components such as a receiver/decoder (IRD) of the direct broadcast satellite (DBS) set-top box and a direct feed to the TV for example.

Other passive devices, typically called splitters (e.g. two way, three way, four way, six way, or eight way splitters) or directional couplers, allow signals to be transmitted from a main source to various devices, such as television sets or set-top boxes, within a home entertainment system. The typical communication across these splitters or directional couplers is input-to-multiple outputs, or multiple outputs to a single input.

The output-to-input or input-to-output configuration of splitters ensures a high output port-to-output port isolation, e.g. to prevent a double image. Connectors are therefore carefully designed and tuned to prevent intermodulation and keep reflected power to a minimum for each input transmitter and frequency. In particular, connectors used in analogue cabling systems for in-home usage typically make use of impedance matching transformers. Passive devices therefore usually have the same impedance as the cables to which they are connected and may further have a similar cutoff frequency. Similarly, the impedance of cables may typically be the same as the load, e.g. the television sets. As is well known, whenever the source of power operates into a load, the greatest power is delivered to the load when the impedance of the load is equal to the resistance of the source.

This configuration has the implication that no signal can be sent from one output to another output of a splitter or directional coupler, as the dB loss, ensuring port-to-port isolation, is too high.

BRIEF DESCRIPTION OF THE DRAWINGS

The present disclosure is pointed out with particularity in the appended claims. However, other features are described in the following detailed description in conjunction with the accompanying drawings in which:

FIG. 2 is a block diagram representative of a diplexer with the integrated impedance imbalance connector of FIG. 1;

FIG. 4 is a simplified diagram representative of the impedance imbalance connector in accordance with a further example embodiment of the present application, where the impedance imbalance connector is integrated into a diplexer;

DETAILED DESCRIPTION

A connector for transferring digital packet-based data over two sections of a coaxial cable is provided. The connector comprises a first port connectable to a first section of coaxial cable, the first port having a first impedance and the first port further to receive digital packet-based data from a first device. The connector further comprises a second port connectable to a second section of coaxial cable, the second port having a second impedance which differs from the first impedance so as operationally to create an impedance imbalance between the second port and the second section of the coaxial cable.

In another aspect of the example embodiment, a method of manufacturing a connector for transferring digital packet-based data over two sections of a coaxial cable is provided. The method comprises providing a connector casing; connecting a first coaxial port to the connector casing, the first coaxial port connectable in use to a first section of coaxial cable and the first port to receive digital packet-based data from a first device. The method further comprises connecting a second coaxial port to the connector casing, the second coaxial port connectable in use to a second section of coaxial cable. A first impedance is electrically connected to the first coaxial port and located in the connector casing. A second impedance is further connected to the second coaxial port and located in the connector casing. The second impedance is different from the first impedance so as operationally to create an impedance imbalance between the second port and the second section of the coaxial cable and its terminated device.

In yet another aspect of the example embodiment there is provided a method of transferring digital packet-based data over two sections of a coaxial cable, the first and second sections of the coaxial cable having a first impedance. The method comprises receiving, at a first port of connector, from the first section of the coaxial cable, digital packet-based data from a first device, the first port having an impedance equal to the first impedance of the first and second sections of the coaxial cable. The method further comprises sending the digital packet-based data, from a second port of the connector, to a passive device, the second port having a second impedance which differs from the first impedance of the second section of the coaxial cable so that an impedance imbalance is created between the second port and the second section of the coaxial cable, and the passive device is enabled to send and receive digital packet-based data between two output ports of the passive device with substantially reduced signal loss between the two ports. The passive device may be a splitter or directional coupler.

Figure 1:
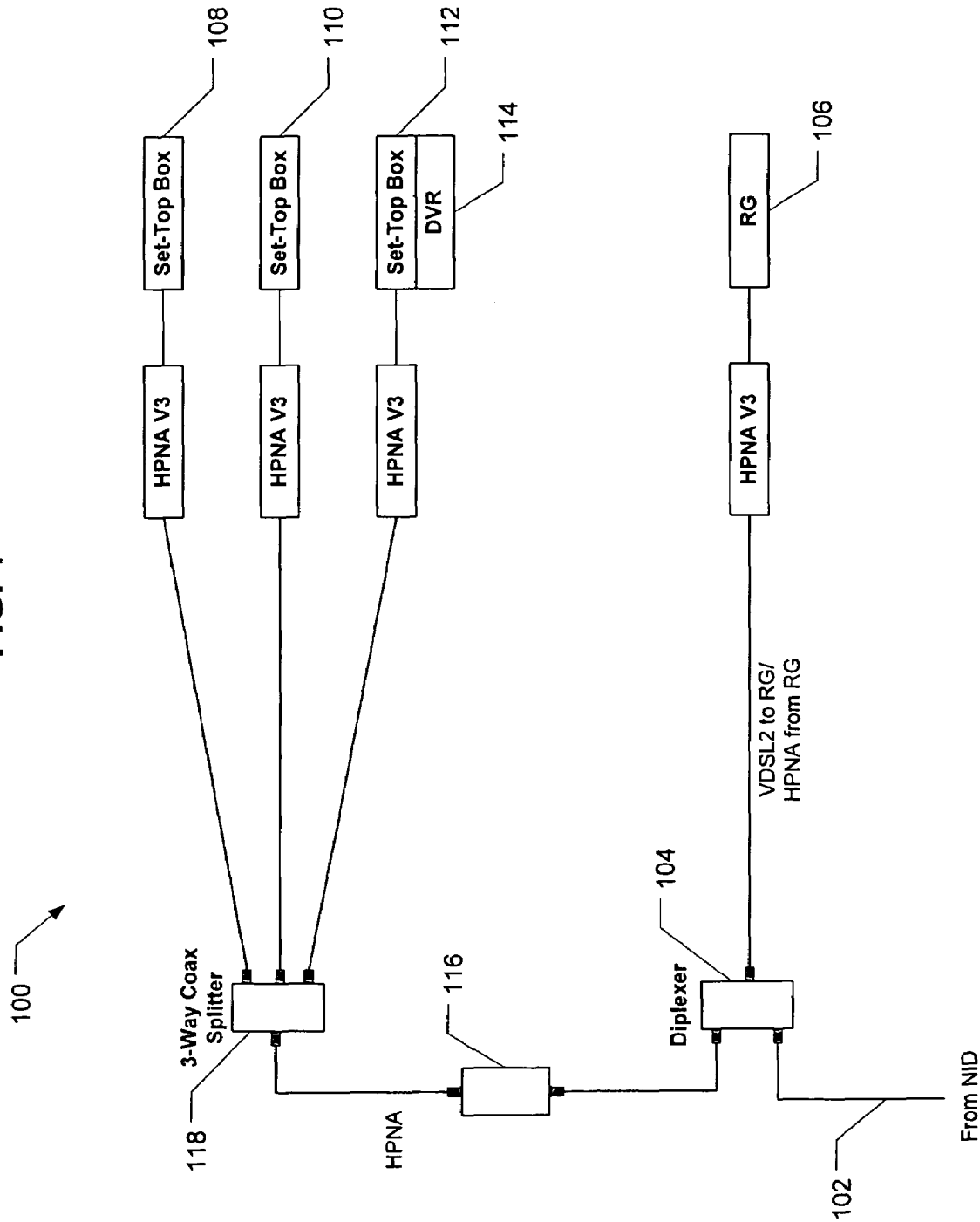
FIG. 1 is a block diagram representative of a system over which digital packet-based data can be sent and received, showing an impedance imbalance connector in accordance with an example embodiment of the present application.

Referring to FIG. 1 and FIG. 2, a system over which digital packet-based data, as well as digital television content, is to be transmitted and received is illustrated and is generally designated 100. The system, in this example deployment, allows very high bit-rate DSL (digital subscriber line) (VDSL), HPNA (Home Phoneline Networking Alliance), and TV RF (television radio frequency) signals to be combined onto and separated from each other through sections of a coaxial cable. The sections of coaxial cable connect a number of connectors and digital entertainment devices, allowing for data signals from the different devices to be transferred between the devices and allowing for such content to be available at anytime anywhere in the network.

The system 100 comprises a section of coaxial cable 102 connected on one end to a network interface device (NID) (not shown), for example a telephone company's termination point. The other end of the section of coaxial cable 102 is connected to a first port 140 (shown in FIG. 2) of a diplexer 104. This section of coaxial cable 102 carries digital signal packet-based communications coming in from the NID.

A second port 142 of the diplexer 104 is connected to a residential gateway (RG) 106. The residential gateway 106 may operationally equivalent to a router. For example, if a particular house uses ADSL, the residential gateway 106 may be a DSL modem/router. In the example embodiment described according to FIG. 1, the residential gateway 106 is a VDSL modem and a router having multiple functions. Wi-Fi is one example of a further functionality that may be provided by the residential gateway 106. Also, although not shown in FIG. 1, a set-top box may be connected to the residential gateway 106.

A third port 144 of the diplexer 104 is connected to a number of digital devices, shown in FIG. 1 as two set-top boxes 108, 110 and a set-top box 112 with an associated DVR 114. The set-top boxes 108, 110 and 112 are connected to the diplexer 104 through an impedance imbalance connector 116, according to an example embodiment, and a splitter 118, such as a three way cable television splitter.

The diplexer 104 is used to separate the various digital packet-based data signals into different frequency bands. As shown in FIG. 2, the diplexer 104 allows the entire bi-directional signal from the NID to enter at the first port 140 and to be transmitted to the residential gateway 106 via the second port 142. For example, the diplexer 104 transmits from its first port 140 xDSL data within a frequency range of 25 kHz to ~8.5 MHz (or for VDSL, up to 17 Mhz), as well as TV RF data within a frequency range of 350 MHz to 700 MHz to the residential gateway 106, via its second port 142. However, although the diplexer 104 allows the data to pass from the first port 140 to the second port 142, none of this data is directed to the impedance imbalance connector 116 or splitter 118 via the third port 144.

At the same time as allowing the signal flow described above, HPNA data signals are transferred bi-directionally between the second port 142 of the diplexer 104 and the third port 144 of the diplexer 104, thereby allowing transmission of data signals between the residential gateway 106 and the set-top boxes 108, 110 and 112. The diplexer 104 directs these data signals from its second port 142 to its third port 144, and vice versa, without any of the data signals being diverted to the NID. The diplexer 104 accordingly allows one set of frequencies to be transmitted in one direction while another set of frequencies are transmitted in another direction. This operation prevents a split of power, as the power is only directed in a certain way.

In this example, xDSL signals between 25 KHz and 8.5 MHz are introduced into the residence from an external network at port 140 of the diplexer, and directed by the diplexer's filter circuitry to the residential gateway via port 142. Similarly, HPNA signals (e.g., 12-28 MHz) originating from an HPNA device located at or in the residential gateway are connected to port 142, and the diplexer's filter circuitry directs these signals to port 144 of the diplexer. Other higher frequency signals, e.g., television RF, may also be passed from port 142 to 144 as part of the diplexer's high-pass filter circuitry. Port 142 would commonly be referred to as a "common" port on the diplexer, since it transports all signal frequencies, while ports 140 and 144 transport only designated component frequencies.

As shown in FIG. 2, the diplexer 104 has the same port impedance on each of its ports. The balanced impedance of the ports typically allows for port to port isolation. The port impedance of each of the first, second and third ports 140, 142 and 144 is 75 ohms, which is also the characteristic impedance of coaxial cables (e.g. RG-6/U) typically used for cable television. The impedance of the ports has historically been designed to be the same as that of the coaxial cables, as well as television sets, thereby to ensure minimum interference and power loss over the coaxial cables and connectors used.

The three way splitter 118 has the same port impedance on each of its ports receiving signals from the diplexer 104 and transmitting such signals to the digital devices 108 to 114. This configuration ensures port-to-port isolation.

As mentioned above, the attenuation caused by the port-to-port isolation of analogue connectors and systems do not allow for output port-to-output port communication of data signals between the connected devices without significant signal loss. For example, a three-way splitter may have either a fixed 5 dB loss from input to any of its output ports, or a second design may exhibit a 7 dB loss at two of its ports, and 3.5 dB loss on the remaining output port. This low loss design allows for information to flow from input port-to-output port and from output port-to-input port having the loss defined on the port. However, the attenuation of the signal from an output port to an output port may be between 20 dB and 30 dB or higher, which effectively impedes communication or data flow between devices connected to these ports.

In order for the digital devices to communicate, the impedance imbalance connector 116 is used. For example, in order for the DVR 114 connected to the third set-top box 112 to play video to any of the other two set-top boxes 108 and 110, the digital packet-based signal has to be transmitted through two outputs of the splitter.

The impedance imbalance connector 116, as shown in the example embodiments of FIGS. 1 to 3A and 3B, comprises a first port 150 connectable to the section of coaxial cable also connected to the diplexer 104, thereby to receive digital packet-based data.

As the impedance imbalance connector 116 can be connected to any part of a digital packet-based network, it will be appreciated that it could be connected to any section of a coaxial cable connected to a first device from which the data is to be transmitted. The first port 150 of the connector 116 has a first impedance, which is typically the same as the impedance of the section of coaxial cable to which the first port 150 of the connector 116 is connected. For example, the first port 150 may have an impedance of 75 ohms, which is equal to the characteristic impedance of coaxial cables used for cable TV.

The impedance imbalance connector 116 further comprises a second port 152 which is connectable to a section of the coaxial cable connected to the three way splitter (a directional coupler). Once again, as the impedance imbalance connector 116 can be connected to any part of a digital packet-based network, it will be appreciated that the second port 152 could be connected to any section of a coaxial cable connected to a second device, typically a passive device such as a splitter or directional coupler, to which the data has to be transmitted.

The second port 152 has a second impedance which differs from the first impedance of the first port 150. For example, the second port 150 may have an impedance lower than the first port 150, such as 56 ohms.

It has been found that when using an impedance of 75 ohms on the first port 150 and 56 ohms on the second port of the impedance imbalance connector 116, the output port-to-output port isolation on the splitter 118 can be lowered from as much as 30 dB to 10 dB or less, which enables the transfer of digital packet-based data signals between the outputs of the splitter 118 at a much improved signal to noise ratio.

This configuration of the impedances of the impedance imbalance connector 116 results in an impedance imbalance between the second port 152 and the section of the coaxial cable connected to the splitter 118 in the first example embodiment of the present application.

As mentioned, this impedance imbalance allows the digital packet-based data signals transmitted across the system, and in particular between the various set-top boxes 108, 110 and 112, to be transmitted between the different outputs of the splitter 118, enabling the DVR to communicate with any of the set-top boxes 108 or 110.

Although the configuration described above causes a mini-reflection problem on the system, this problem is outweighed by the communication advantage the impedance imbalance connector 116 provides in terms of providing a significant improvement to signal to noise that might have enabled these mini-reflections. The impedance imbalance connector 116 does so by "detuning" the splitter from its normal impedance match and reduces the apparent impedance between output ports on the splitter.

Figure 3A:
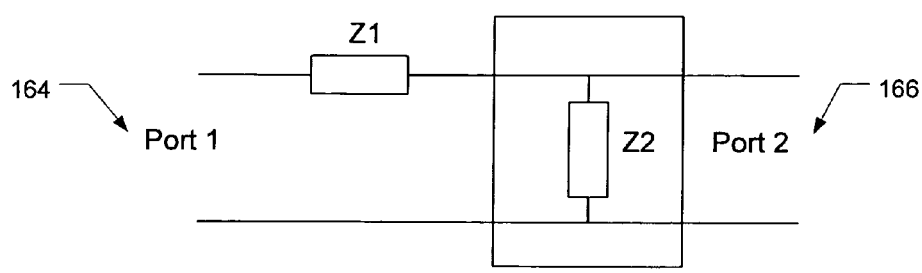
FIGS. 3A and 3B are diagrammatic representations of impedance imbalance connectors, showing example embodiments of the impedance configuration of the impedance imbalance connector.
Figure 3B:
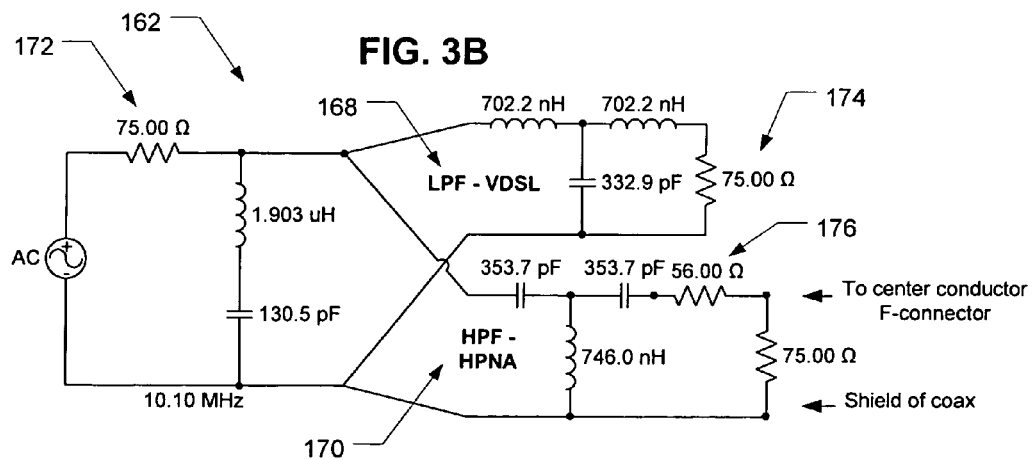

FIGS. 3A and 3B are diagrammatic representations of impedance imbalance connectors, showing example embodiments 160 and 162 of impedance configurations of the impedance imbalance connector.

FIG. 3A shows a simplified impedance imbalance connector having two ports 164 and 166. Each port has an associated impedance, with the impedance Z1 of Port1 164 being 75 ohm and the impedance Z2 of Port2 166 being 56 ohms, thereby to ensure reduced signal loss between the two ports.

FIG. 3B shows a detailed diagrammatic representation of an impedance imbalance connector, with the impedance imbalance connector having a low pass filter (LPF) circuit 168 and a high pass filter (HPF) circuit 170. The LPF circuit 168 allows the frequency ranges of VDSL data to pass, while the HPF circuit 170 allows the frequency ranges for HPNA data through. As can be seen, two 75 ohm resistors 172 and 174 are used, while a 56 ohm resistor 176 is used at the port to be connected to the coaxial cable. The 75 Ohm resistors 172 and 174 are to match the impedance of the coaxial cable and the 56 Ohm resistor 176 is to cause a mis-match in the direction of the coax splitter to reduce the output port to port isolation. The coaxial cable is connected by connecting the shield of the coaxial cable and the center conductor of the coaxial cable to two distinct points, and has a resistance of 75 ohm. As mentioned above, this enables reduced signal loss between the ports.

FIG. 4 shows a further example embodiment of the present application where the impedance imbalance connector is incorporated in a directional coupler such as a diplexer 180. The diplexer 180 includes three ports 182, 184 and 186 and may be connected in a similar configuration as the configuration described in FIG. 1.

For example, the first port 182 of the diplexer 180 may be connected to a network interface device (NID) via a section of coaxial cable and may carry digital signal packet-based communications coming in from the NID. The second port 184 of the diplexer 180 may transmit xDSL data from the NID to the residential gateway, and may further be used to transmit HPNA data from the residential gateway to the third port 186 of the diplexer 180, for further transferring the data signals to a three way coaxial splitter and on to digital devices.

In this example embodiment of the application, the first and second ports 182 and 184 of the diplexer 180 have the same impedance. For example, the first and second ports 182 and 184 may each have an impedance of 75 ohm to mirror the characteristic impedance of the coaxial cable sections to which the ports are connected.

The third port 186 of the diplexer 180 may be connected via a directional coupler, such as a three way splitter, to a number of digital devices, e.g. set-top boxes and associated DVR devices. As the impedance imbalance connector of the present application is incorporated in the diplexer, the third port 186 of the diplexer 180 is provided with an impedance that differs from the impedance of the other ports, and typically also differs from the characteristic impedance of the coaxial cables to which the ports are connected.

As described above, the diplexer 180 allows one set of frequencies to be transmitted in one direction while another set of frequencies are transmitted in another direction. This operation prevents a split of power causing a reduction in power, as the power is only directed in a certain way.

The difference in impedance between the ports and in particular, between the ports and the coaxial cables, causes an impedance imbalance which lessens the attenuation caused by the output port-to-output port isolation of the splitter connected to the third port 186. For example, the third port 186 may have an impedance lower than the first and second port 182 and 184, such as 56 ohms. It has been found that when using an impedance of 75 ohms on the first port and second ports 182 and 184 and an impedance of 56 ohms on the third port 186, the port-to-port isolation on the splitter 118 could be lowered from as much as 30 dB to 10 dB or less, which allows for the transferal of digital packet-based data signals between the outputs of the splitter 118.

This configuration of the impedances of the diplexer 180 operationally creates an impedance imbalance between the third port 186 and the section of the coaxial cable connected to the splitter, as described above.

Figure 5:
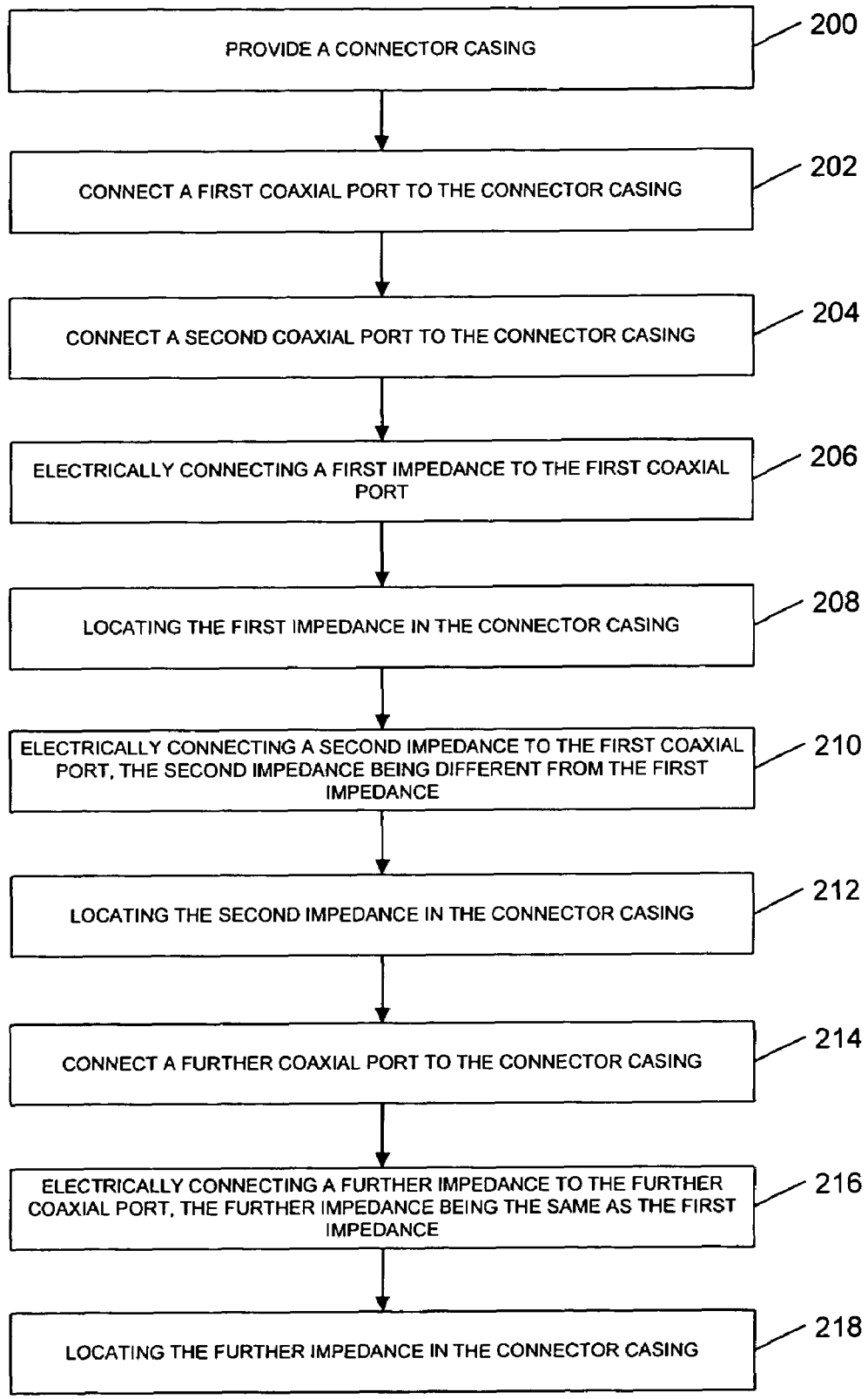
FIG. 5 shows a flow chart to illustrate a method of manufacturing an impedance imbalance connector for transferring digital packet-based data over two sections of a coaxial cable in accordance with an example embodiment of the present application.

An example method of (or process for) manufacturing the connector for transferring digital packet-based data over two sections of a coaxial cable is now described in accordance with the flow chart of FIG. 5. In operation 200 a connector casing (shown as reference numeral 154 in FIG. 2) is provided. It will be appreciated that the shape and size of the connector casing will be dependent on the specific application of the impedance imbalance connector, and whether or not the connector forms part of a directional coupler or diplexer.

A first coaxial port 150 is connected to the connector casing 154 in operation 202. The first coaxial port 150 is connectable in use to a first section of coaxial cable and receives digital packet-based data from a first device, such as a diplexer.

As shown in operation 204, a second coaxial port 152 is now connected to the connector casing 154. The second coaxial port 152 is connectable in use to a second section of coaxial cable, typically connected the second port 152 to a splitter or directional coupler.

In operations 206 and 208 the first impedance is electrically connected to the first coaxial port 152 and located in the connector casing 154. Similarly, in operations 210 and 212, the second impedance is electrically connected to the second coaxial port and the second impedance is located in the connector casing 154. The second impedance differs from the first impedance so as operationally to create an impedance imbalance between the second port and the second section of the coaxial cable. This enables the directional coupler connected to the second port to send and receive digital packet-based data between any two of its output ports.

In circumstances where the impedance imbalance connector forms part of a passive device, such as a directional coupler, diplexer or splitter, the method may further include operations 214 to 218. For example, in operation 214 a further port is connected to the connector casing, with the further port being connectable in use to a further section of coaxial cable. An impedance which is equal to the first impedance of the first port is electrically connected to the further port in operation 216 and located in the connector casing in operation 218.

The method may further include connecting a high pass filter and/or a low pass filter circuit to the first or second port, and further locating the circuitry in the connector casing. These operations would enable the manufacture of an impedance imbalance connector as shown in FIG. 3B.

Figure 6:
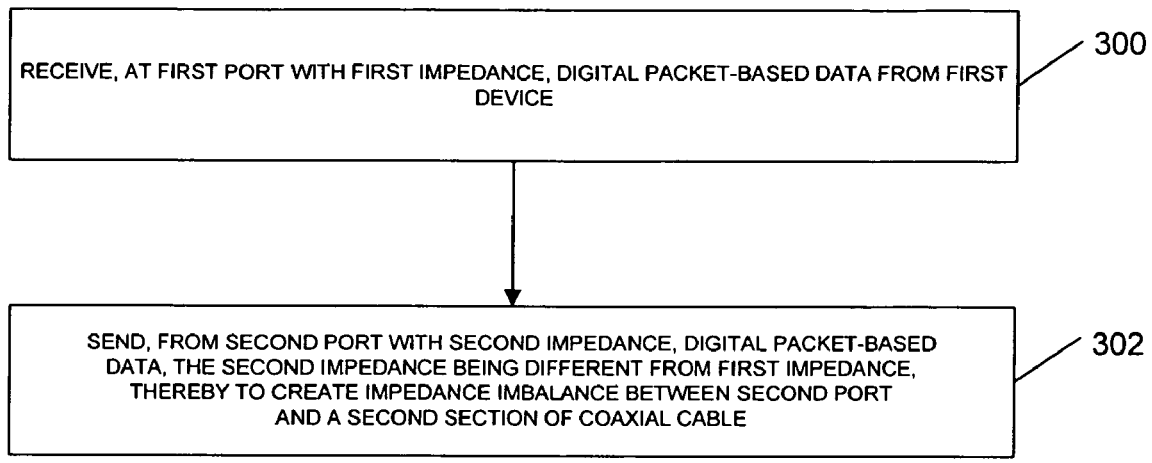
FIG. 6 shows a flow chart to illustrate a method of transferring digital packet-based video over two sections of a coaxial cable in accordance with a further aspect of the present application.

A method of transferring digital packet-based data over two sections of a coaxial cable is described in accordance with an example embodiment illustrated by the flow chart of FIG. 6. The method specifically relates to a system where the first and second sections of the coaxial cable have a first impedance. In operation 300, digital packet-based data is received, at a first port of a connector, from the first section of the coaxial cable, from a first device. The first port has an impedance equal to the first impedance of the first and second sections of the coaxial cable.

In operation 302, digital packet-based data is sent, from a second port of the connector, to a directional coupler. The second port has a second impedance which differs from the first impedance of the second section of the coaxial cable so that an impedance imbalance is created between the second port and the second section of the coaxial cable. This impedance imbalance enables the directional coupler to send and receive digital packet-based data between two output ports of the directional coupler.

Accordingly, certain example embodiment address a need to communicate from one output port of a directional coupler to another output port of the same directional coupler, for example in a home networking environment, where a number of devices such as television sets, set top boxes, VCRs and computer equipment are to be connected and where digital packet-based data is to be transferred across the coaxial cabling system connecting these devices.

What is claimed is:

1. A connector comprising:
a first port connectable to a first section of coaxial cable, the first port and the first section having a first impedance and the first port further to receive digital packet-based data from a first device; and
a second port coupled to a second section of coaxial cable having the first impedance, the second port having a second impedance which differs from the first impedance to provide an impedance imbalance between the second port and the second section of the coaxial cable.

2. The connector of claim 1, wherein the digital packet-based data is video data.

3. The connector of claim 1, further comprising a further port connectable to a further section of coaxial cable, the further port having an impedance which is equal to the first impedance of the first port, and the further port to receive or transmit digital packet-based data from a further device.

4. The connector of claim 1, wherein the connector forms part of a directional coupler or diplexer.

5. The connector of claim 1, wherein the first impedance of the first port and the impedance of the first section of coaxial cable is 75 ohm.

6. The connector of claim 5, wherein the second impedance of the second port is 56 ohm.

7. A connector, comprising:
a first port configured to communicate digital packet-based signals and coupled to a first device;
a filter network coupled to the first port and having a low-pass filter segment and a high pass filter segment configured to exclude signals below a predetermined cutoff frequency while communicating signals above the cutoff frequency; and
a second port coupled to an output of the high pass segment, wherein the high pass filter segment includes an impedance element that presents an impedance imbalance to a second device coupled to the second port.

8. The connector of claim 7, wherein the first port includes a first impedance, and the second port includes a second impedance, comprising a third port coupled to the first port that includes the first impedance.

9. The connector of claim 7, wherein the low pass filter segment is configured to reject signals at frequencies below approximately 25 kHz, and the high pass filter segment is configured to reject signals below approximately 12 MHz.

10. The connector of claim 7, wherein the first port is a common port that is configured to communicate signals in the range between approximately 25 kHz and approximately 700 MHz.

11. A connector for transferring digital packet-based data over sections of a transmission line, comprising:

a first port having a first impedance that is coupled to a first section of the transmission line, wherein the first section includes a characteristic impedance that is approximately equal to the first impedance; and a second port having a second impedance different from the first impedance that is coupled to a second section of the transmission line to provide an impedance imbalance between the second port and the second section of the transmission line.

12. The connector of claim 11, comprising a third port coupled to a third section of the transmission line, wherein the third port includes an impedance that is approximately equal to the characteristic impedance of the transmission line.

13. The connector of claim 11, wherein at least one of the first section and the second section comprises a coaxial transmission line.

14. The connector of claim 11, wherein the connector comprises a portion of a directional coupler or a diplexer.

15. The connector of claim 11, wherein the first impedance and the impedance of the first section of the transmission line ranges between 56 ohm and 75 ohm.

16. The connector of claim 11, comprising a low pass filter configured to reject signals at frequencies below approximately 25 kHz, and a high pass filter segment configured to reject signals below approximately 12 MHz.

17. The connector of claim 11, wherein the first port is a common port that is configured to communicate signals in a frequency range between approximately 25 kHz and approximately 700 MHz.

18. A connector comprising:

a first port configured to receive data from a source device via a first section of coaxial cable, the first port having a first port impedance and the first section of coaxial cable having a cable impedance; and a second port configured to direct the data towards multiple load devices via a second section of coaxial cable having the cable impedance, the second port having a second port impedance that is different from the cable impedance to provide an impedance imbalance between the second port and the second section of coaxial cable so as to affect a signal-to-noise ratio associated with communication between a first device of the multiple load devices, and a second device of the multiple load devices.

19. The connector of claim 18, wherein the first port impedance is substantially similar to the cable impedance.

* * * * *